May 1, 1945. W. F. PIOCH ET AL 2,374,894
METHOD AND APPARATUS FOR ASSEMBLING AIRCRAFT FUSELAGES
Filed June 16, 1943 3 Sheets-Sheet 2

W. F. Pioch
G. E. Scarlett
INVENTOR.

May 1, 1945. W. F. PIOCH ET AL 2,374,894
METHOD AND APPARATUS FOR ASSEMBLING AIRCRAFT FUSELAGES
Filed June 16, 1943 3 Sheets-Sheet 3
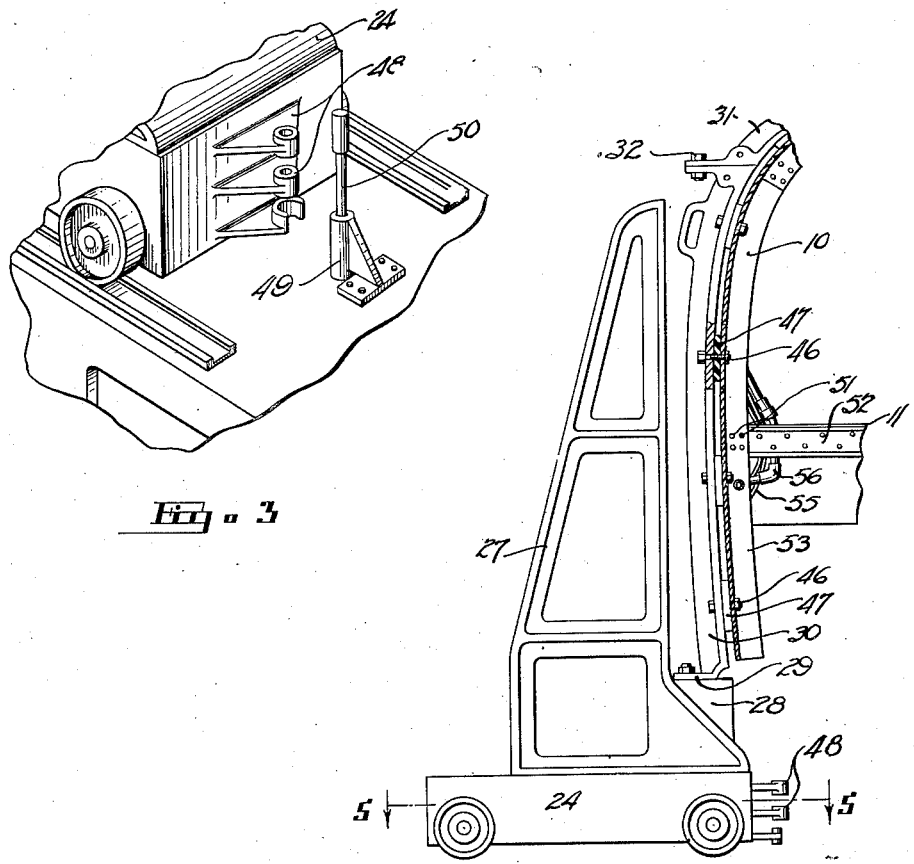
W. F. Pioch
G. E. Scarlett
INVENTOR.

Patented May 1, 1945

2,374,894

UNITED STATES PATENT OFFICE 2,374,894

METHOD AND APPARATUS FOR ASSEMBLING AIRCRAFT FUSELAGES

William F. Pioch and George E. Scarlett, Detroit, Mich., assignors to Ford Motor Company, Dearborn, Mich., a corporation of Delaware Application June 16, 1943, Serial No. 491,002

2 Claims. (Cl. 29—148.2)

This invention relates to the assembly of airframe structures; and, more particularly, to a method and apparatus used in assembling fuselages in components to intermediate transverse structures.

The object of this invention is to devise a method and apparatus by means of which the fuselage skin panels can be speedily and accurately assembled with respect to each other although joined only by an intermediate transverse component and not in direct contact. The construction of aircraft fuselages by fabricating two longitudinally extending component halves in which the necessary equipment and connections are initially installed and then brought together and mated to form a completed fuselage has been suggested in the past. It has the advantage of greater accessibility during fabrication of the subcomponents and assembling of the miscellaneous equipment therein; and since the halves immediately abut during assembly operation, it is possible to obtain a satisfactory degree of accuracy. However, in the larger ships, a further division of subcomponents has been found to be necessary. If the large fuselage is made in longitudinal extending halves, the structures are so large that they are unwieldy to handle and it is difficult to provide sufficient internal working space so that the subcomponents can be fabricated expeditiously. At the same time the amount of miscellaneous equipment is considerably increased and it becomes almost as difficult to interconnect this material between the large halves as it would be to install it initially in the completed ship. To avoid the disadvantages the fuselage is further broken down and instead of halves the subcomponents are arranged in quarters and thirds or even smaller units, as may be desired. The difficulty with this is that when the subcomponents are brought together for assembly there are no longer merely two abutting surfaces to join but a number of discontinuous units and since the equipment located on each panel must be interconnected with that on adjacent panels, the question of accessibility again becomes important. The present invention comprises a method by means of which these subcomponents may be successively brought together and assembled while maintaining accessibility and insuring that in the intermediate assembly steps the proper relationship of the subcomponents is maintained so that each will fit precisely into the completed structure.

An advantage of this invention is that it is possible to assemble parts not in direct contact with each other and yet maintain them in precise alignment. Another advantage is that means are provided for the interconnection of equipment on abutting subcomponents when said subcomponents are separated providing accessibility and for the subsequent joining of the subcomponents after the equipment connections have been completed. Another advantage is that this invention permits the assembly of separated skin panels joined only by a transverse member and yet assures that the skin sections are not only in proper relationship with the transverse member but also are arranged in precise location with respect to each other. It also provides interrelated supports for transverse and panel members so arranged that subcomponents may be disposed in them without interfering with the accessibility of each other, either during the placing, interconnection of equipment, or actual assembly of one to the other. While, of course, the utility of this invention depends upon the complete interexchangeability of subcomponents, it also insures that the advantages which flow from interchangeability are fully utilized.

With these and other objects in view, the invention consists in the arrangement, construction and combination of the various parts of the improved device, described in the specification, claimed in the claims and illustrated in the accompanying drawings, in which:

Figure 3 is an enlarged perspective view showing the construction of the pin locating device.

Figure 4 is an elevation on an enlarged scale of one of the carriages and its associated buttress; the skin panel being shown in section.

Figure 5 is a sectional plan view of one of the carriages and the interconnecting mechanism showing a suggested drive construction.

Figure 1:
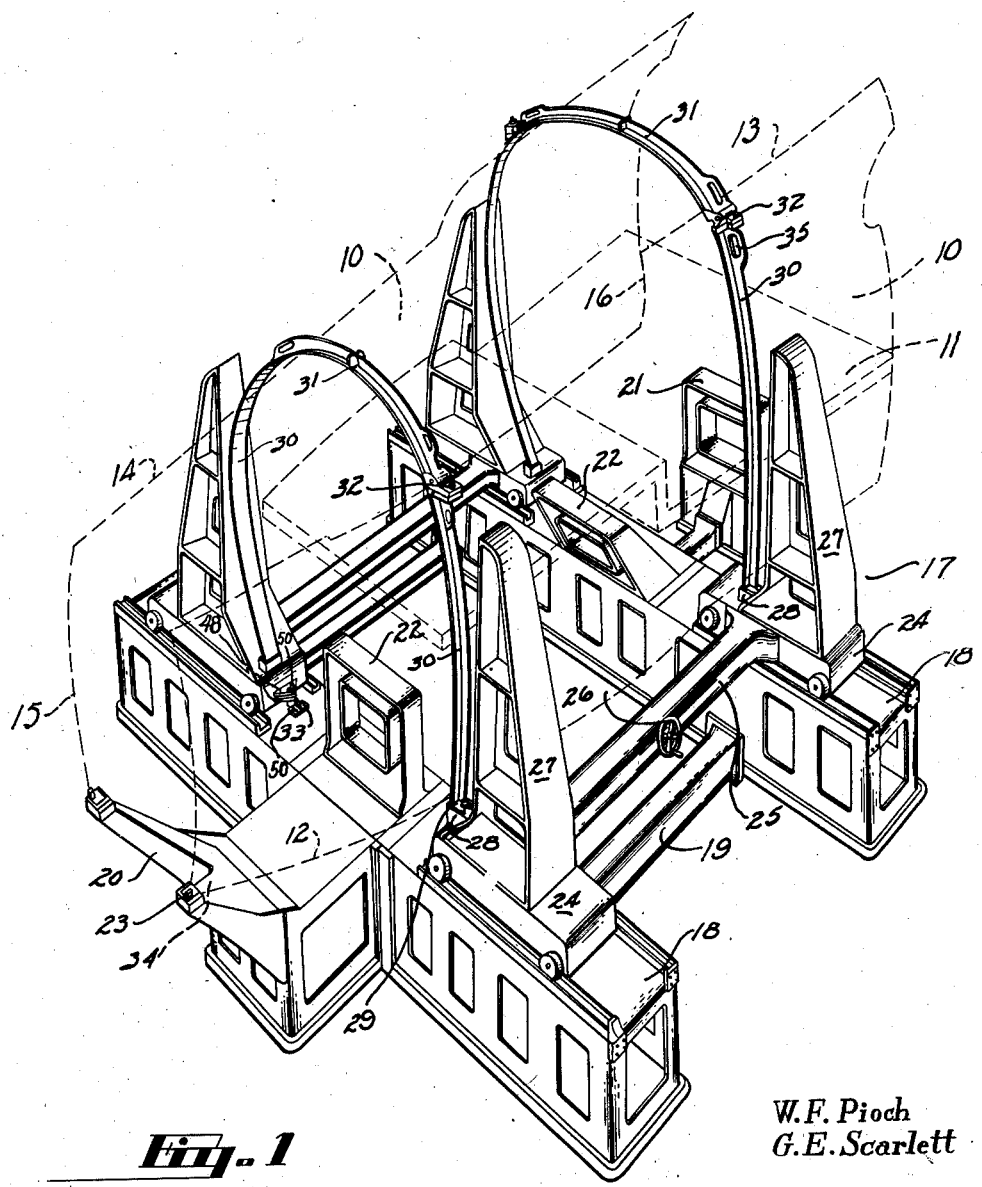
Fig. 1 is a perspective view of the apparatus of this invention, the airframe subcomponents to be assembled therein shown in phantom.

As an example, an apparatus for the assembly of the two side panels of the front fuselage portion to the transverse pilot's floor extending therebetween has been chosen. As shown in phantom in Fig. 1 and in full line in Fig. 2, these comprise the side panels 10 and the pilot's floor 11 which extends transversely across the fuselage section about midway between the top and bottom. This front fuselage component would normally be completed, in subsequent operations, by the addition of a bottom panel along the line 12, a canopy along the line 13, a deck along the line 14, bombardier's enclosure along the front line 15 and a pilot's enclosure along the line 16. The present operation, however, contemplates only the assembly of the side panel 10 and the pilot's floor 11, together with the numerous connections required for engine control, navigation control, radio and electric wiring, hydraulic piping and the many other essential communicating means which center at the pilot's floor area and proceed therefrom to points throughout the ship. It will be understood that the showing of these components as such is highly simplified and that no attempt has been made to include any indication of the various equipment connections which must be made or even of the details of structural connections between the pilot's floor itself and the adjacent side panel. This invention relates primarily to the apparatus used in assembling these components and the method followed in the operation.

This apparatus comprises a fixture generally indicated at 17, having two transverse runways 18 rigidly located with respect to each other by means of the base struts 19 and including the forward projection 20 on one runway and an aft projection 21 on the other as well as intermediate supports 22 on each of the runways. The purpose of the aft projection and the intermediate supports is to locate the pilot's floor 11 which is brought to the fixture as a completed subassembly on skids 36 which are mounted on the fixture in predetermined position and secured with respect thereto. The forward projection 20, on the other hand, has engaging lugs 23 which secure the forward lower corner of the side panels when these have been located in the desired position. Thus, though the pilot's floor extends substantially to the rear of the fuselage panel, it ends far short of the front of the panel 10 (see Figure 2), and the forward projection 20 provides a support during structural connection operations for this otherwise unsupported portion.

Mounted on each of the runways 18 are carriages 24 which are interconnected by the carriage strut 25 including an interconnecting drive mechanism controlled by the hand wheel 26 by means of which the carriages on one side may be moved simultaneously inwardly or outwardly. As shown in Figure 5, the handwheel 26 is connected through bevel gears 40 to a shaft 41 supported in bearings 42 in the strut 25 and carriage 24. At the carriage end of the shaft 41, there is a chain drive connection 43 to one of the axles 45 of the carriage 24, thereby permitting the wheels 44 to be driven to move the carriage. Mounted on each carriage is a vertically extending buttress 27 and adjacent the foot of this is a perch 28 to which may be bolted, in predetermined position, the lower mating surfaces 29 of the side straps 30. These side straps are accurately secured to the side panels 10 as more fully explained in the co-pending application for aircraft fuselage construction filed simultaneously herewith in the names of C. E. Sorensen and L. C. Miller and to which reference is made for a more complete description of these elements. Thus, as shown in Figure 4, the side panel 10 is bolted to the side straps 30 at 46 through an intervening rubber block 47. Upper spacing of the side panels is assured by the top straps 31 which are bolted to the side straps 30 at 32. A bottom panel, not shown, will subsequently be attached to the side panels after removal of the subassembly from the fixture and it will be located by similar straps attached to it and engaging the lower ends of the side straps, as explained in the co-pending application.

Figure 2:
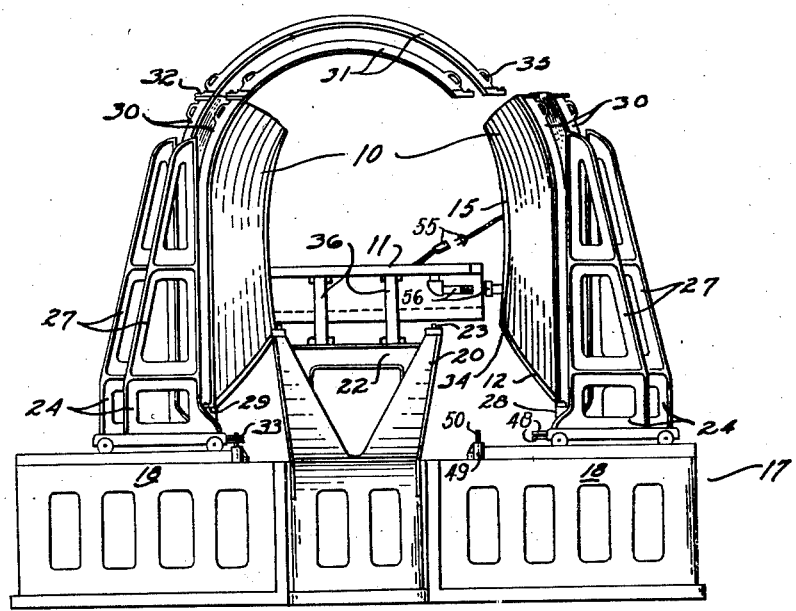
Fig. 2 is a front elevation of the apparatus showing the subcomponents, in highly simplified form, in place thereon.

In operation, the pilot's floor 11 is mounted on the intermediate supports and the aft projection and is aligned by them to the proper relationship with the remainder of the fixture. The carriages 24 are withdrawn to the position shown in the right-hand side of Fig. 2, and the side panel 10 with its side straps 30 attached is brought into position as shown there and bolted to the perches 28. This is done with both side panels, one being mounted on each carriage. The hand wheel 26 is then operated to bring both carriages to the position shown on the left-hand side of Fig. 2 which translates the panels toward the pilot's floor and into proper relationship with it as governed by the pin gages 33. These pin gauges as indicated in Figures 1 and 2 and shown in detail in Figure 3, include a plurality of locating bushings 48, secured to the forward end of the carriage, a pin-receiving socket 49 on the base 18 and a pin 50 adapted to pass through the bushings and into the socket when the two elements are properly aligned. The work of permanently securing the panel to the floor may then be carried out since all three elements are now held in fixed alignment. These structural connections are indicated at Figure 4 by the rivets 51 which connect the floor member 52 to the skin panel bulkhead 53. This, of course, is a standard form of construction and no novelty, per se, is claimed for it herein. Prior to moving the panels into engagement with the pilot's floor, many of the numerous service connections between the panels and the floor may be made, the fact that there is additional clearance between these elements giving much greater accessibility and ease of operation in completing these connections. The service connections such as electrical wiring, hydraulic piping, Bowden cables, fuel lines, and the other numerous connections necessitated between the pilot's position and the remainder of the ship are indicated in Figures 2 and 4. One such is an electrical connection indicated at 55, and another hydraulic connection shown at 56. These may be separably connected by a plug and a sleeve, respectively, or any other conventional method, or may be permanently connected by soldering or the like. They are also indicated in Figure 4. As the advancing movement is one of translation, purely, the connections so made are not deranged during the advancing step. After the panels are moved inwardly to engage the pilot's floor, the top strap 31 is secured to the top mating surfaces of the opposite side strap adding to the rigidity of the structure, and in the same way the lower forward corners of the side panel 34 engage the lugs 23 in the forward projection 20 and are secured in proper relationship with the remainder of the fixture. The panels are then permanently attached to the floor structure. Thereafter, the lower ends of the side straps 30 may be released from the perches 28 and the corners 34 from lugs 23; and the carriages 24 are then retracted to the position shown in the right-hand side of Fig. 2, the subassembly being supported on the intermediate members 22. The completed subassembly, with the side and top straps still in place, is then removed from the fixture by engaging the eyes 35 with suitable tackle and the operation repeated with subsequent components.

The principal advantage of the present invention is that it permits the locating of the side panels and the pilot's floor in accurate yet extended relationship so that many of the service connections may be made under conditions of accessibility; and also provides an accurate means of positioning the panels exactly in contact with the pilot's floor and securing them in this final position while the structural assembly steps are carried out. At the same time, the panels are aligned not only in the area adjacent the pilot's floor but the upper portions are interlocked by means of the cross top strap construction while the lower and forward portions are guided by the perches on the carriages and by the forward lower projections, respectively. This means that the assembly may be carried out speedily, and there is no difficulty with minute adjustments or necessity to see-saw the subcomponents into alignment.

Some changes may be made in the arrangement, construction and combination of the various parts of the improved device without departing from the spirit of the invention, and it is the intention to cover by the claims such changes as may reasonably be included within the scope thereof.

The invention claimed is:

1. The method of assembling aircraft fuselage panels or the like to transverse members extending therebetween, said assembly steps including structural connections between said respective components and service connections including control linkages and wiring and hydraulic piping and the like between equipment on said several components, comprising, the steps of fixedly securing said transverse member in a predetermined central horizontal position, mounting said panels in a substantially vertical position on each side thereof and spaced therefrom, making said service connections, translating said panels into engagement with said transverse member while preserving the initial horizontal alignment thereof, securing said panels in said position of engagement, and making permanent structural connections between said panels and said transverse members while so secured.

2. In jig apparatus for assembling side panels of aircraft fuselage structures to an intermediate transverse floor member extending therebetween, a pair of spaced base members arranged normally to the longitudinal axis of and intermediate the ends of said fuselage structure, said base members being rigidly interconnected, a support on each base member projecting thereabove and adapted to engage said floor member in predetermined elevation and alignment, a pair of opposed carriages mounted on tracks on each of said base members for controlled movement therealong, the carriages at corresponding ends of said base members being rigidly interconnected to insure simultaneous movement thereof, a buttress mounted on each carriage including a perch, said perch adapted to engage the feet of straps secured to said side panels and secure said panel in predetermined elevation and alignment with said supports in said base members, locating means on said base members to engage said carriages in predetermined final position when said side panels engage said floor member, and independent locating means on at least one of said bases spaced a substantial distance from said carriages and adapted to engage said side panels directly when said side panels engage said floor member.

WILLIAM F. PIOCH.
GEO. E. SCARLETT.